(12) United States Patent
Neelakandan et al.

(10) Patent No.: US 10,324,457 B2
(45) Date of Patent: Jun. 18, 2019

(54) ROBOTIC PROCESS AUTOMATION FOR SUPPLY CHAIN MANAGEMENT OPERATIONS

(71) Applicant: Global eProcure, Clark, NJ (US)

(72) Inventors: Subramaniyan Neelakandan, Navi Mumbai (IN); Ankit Tyagi, Haryana (IN); Dhananjay Nagalkar, Bridgewater, NJ (US)

(73) Assignee: Global EProcure, Clark, NJ (US)

( * ) Notice: Subject to any disclaimer, the term of this patent is extended or adjusted under 35 U.S.C. 154(b) by 153 days.

(21) Appl. No.: 15/593,025

(22) Filed: May 11, 2017

(65) Prior Publication Data
US 2018/0329399 A1  Nov. 15, 2018

(51) Int. Cl.
| | | |
|---|---|---|
| *G05B 19/418* | (2006.01) | |
| *G06Q 10/06* | (2012.01) | |
| *G06Q 10/08* | (2012.01) | |
| *G06Q 50/28* | (2012.01) | |
| *G06N 3/00* | (2006.01) | |
| *B25J 9/16* | (2006.01) | |

(52) U.S. Cl.
CPC .......... *G05B 19/41865* (2013.01); *B25J 9/16* (2013.01); *G06N 3/006* (2013.01); *G06Q 10/06315* (2013.01); *G06Q 10/087* (2013.01); *G06Q 50/28* (2013.01); *G05B 2219/39369* (2013.01)

(58) Field of Classification Search
CPC combination set(s) only.
See application file for complete search history.

(56) References Cited

U.S. PATENT DOCUMENTS

2013/0262104 A1* 10/2013 Makhija .................. G10L 15/26
704/235
2014/0358549 A1* 12/2014 O'Connor ........... G06F 9/44505
704/270

* cited by examiner

*Primary Examiner* — Kyle O Logan
(74) *Attorney, Agent, or Firm* — David M. Breiner; BrownWinick Law Firm

(57) ABSTRACT

The present invention discloses robotic process automation (RPA) of supply chain management (SCM) operations. In example embodiments the invention discloses RPA method and systems for supply chain management. The RPA systems include IOT devices and server as part of a sub network for secured communication relating to SCM operations like procurement operations. The system and method of the present invention utilizes AI based processing logic using a bot for automation of SCM operations thereby reducing the processing times and increasing efficiency.

25 Claims, 4 Drawing Sheets

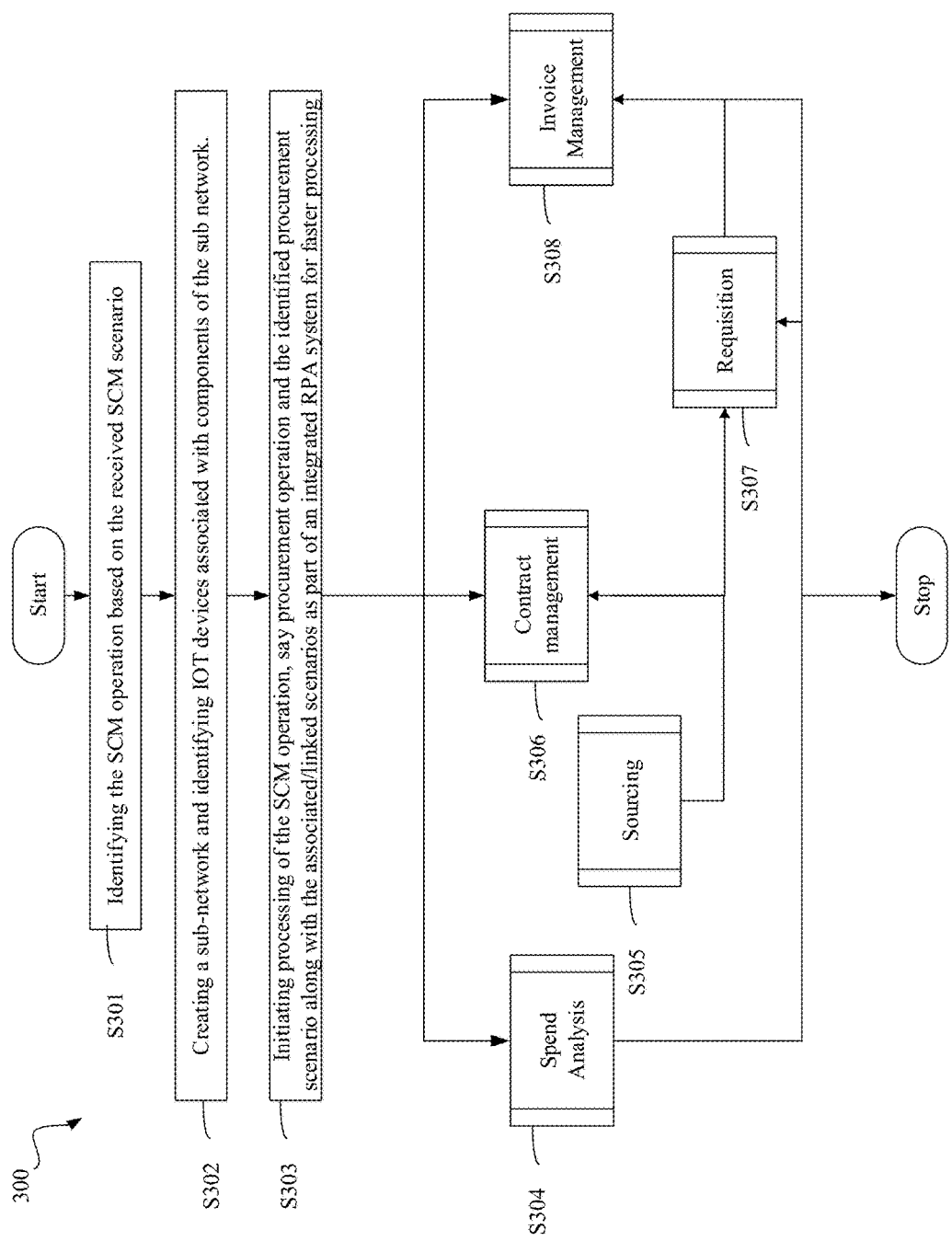

ROBOTIC PROCESS AUTOMATION FOR SUPPLY CHAIN MANAGEMENT OPERATIONS

BACKGROUND

1. Technical Field

The present invention relates generally to robotic process automation. More particularly, the invention relates to systems, methods and computer program product to enable robotic process automation for supply chain management operations.

2. Description of the Prior Art

In a supply chain management organization with procurement operations, due to multiplicity of tasks, the time within which a particular operation is executed plays a significant role. The general processes that have been performed manually on a computer over the years are repetitive and time consuming. For example, a user may raise a requisition by going to an application, creating a requisition for procurement based on the requirement, forwarding it for approval, and for each step of requisition process, may need to manually interact with a computer to click buttons to open a window, click buttons to copy information, compose e-mail for approvals, click keys to write text for a body of the e-mail, and click buttons to send the e-mail for approvals.

In supply chain management organizations, due to multiple operations, highly skilled labors are required who understand the coding techniques and can code for automating processes based on the requirement. Even for automation, its time consuming creation of scripts which means the productivity is very low.

Further, some of the known automation process undergo lot of changes whenever there is a change in any application used for the supply chain management process. The changes include technical framework underlining languages like .net, JAVA, etc., and their updated versions, hence maintenance of such supply chain management systems is high as some minor changes in an application would need a big effort to correct and debug the full script.

There are prevailing arts on automation such as U.S. Pat. No. 9,555,544 titled "Robotic process automation". However, there are problems associated with the prior art. U.S. Pat. No. 9,555,544 utilizes images for automation, however, image processing requires high resolution devices and relatively high data storage requirements. In addition, their processing speed is less and hence requiring more time for execution. Furthermore, the prior art systems have high maintenance, if there is any change in hardware or screen resolution, it may not work properly. The existing systems are error prone and there are no means to determine or verify accuracy of the systems.

None of the existing prior art provides robotic process automation with high efficiency in supply chain management operations like a procurement operation involving multiple complex processes. Accordingly, there is a need in the art for improved systems and methods of robotic process automation for supply chain management operations.

SUMMARY

In an embodiment of the invention, a robotic process automation (RPA) system for supply chain management (SCM) operations is provided. The example system includes an electronic user interface configured to perform a plurality of SCM operations. The example system further includes at least one processor, configured to automatically generate code for at least one SCM scenario. The at least one SCM scenario is selected from the plurality of SCM operations by a user. The example system also includes a controller encoded with instructions enabling the controller to function as a bot configured to generate a plurality of fixtures created for performing the plurality of SCM operations by utilizing a library of functions stored on a functional database and a sub network having at least one server configured to process the plurality of fixtures to identify relevant fixtures for the at least one SCM scenario. The system further includes a control unit configured to process the at least one SCM scenario based on the identified relevant fixture for automating the SCM operations. The control unit selects an Artificial Intelligence based dynamic processing logic using the bot to reduce the processing time of the SCM operations.

In an embodiment of the present invention, a robotic process automation (RPA) method for supply chain management (SCM) operations is provided. The method comprises the steps of receiving at least one SCM scenario from a user through an electronic user interface, storing the at least one SCM scenario in a SCM scenario database, creating a sub network having at least one server based on the received scenario, identifying at least one relevant fixture based on the received scenario, embedding the SCM scenario specific data on the identified fixture to generate xml file, sending the xml file to an execution engine for executing the scenario on an application, identifying by the execution engine, an appropriate data object/dome in the application for processing the received SCM scenario, and communicating to the control unit a result from the execution engine for enabling the control unit to identify and select an artificial intelligence based dynamic processing logic using a bot to process the SCM operations.

In an embodiment of the present invention, a computer program product for robotic process automation on an application of a computing device with memory is provided. The product includes a computer readable storage medium readable by a processor and storing instructions for execution by the processor for performing the method of robotic process automation for procurement operations.

The present invention provides several advantages over the prior art. For example, in one advantageous aspect, the present invention provides a RPA system and method for SCM operation with faster processing times, reduced error and verification means for accurate results. The system utilizes sub network of devices and server for secured communication with reduced processing time due to automatic creation of fixtures by a bot utilizing AI processing to minimize the processing steps of a supply chain management operation. The system includes creation of fixtures based on application object/dome for accurate results. All of this results in a significant improvement in the overall functioning of a computer system.

BRIEF DESCRIPTION OF THE DRAWINGS

The disclosure will be better understood and when consideration is given to the drawings and the detailed description which follows. Such description makes reference to the annexed drawings wherein:

FIG. 3 is a flowchart depicting a method of robotic process automation for supply chain management operations with integrated scenarios and sub-network components in accordance with an embodiment of the present invention.

DETAILED DESCRIPTION

Figure 1:
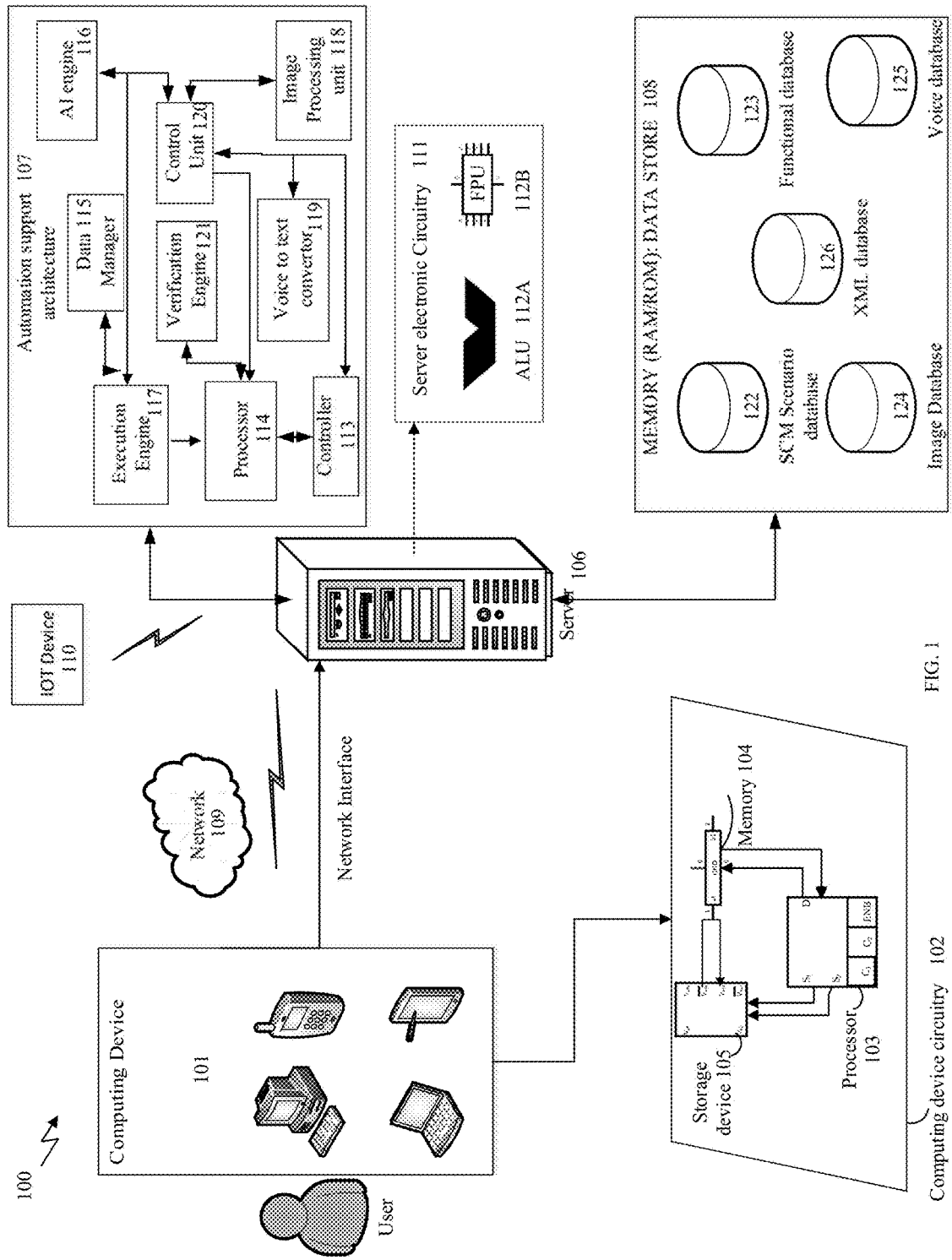
FIG. 1 is a view of a robotic process automation (RPA) system for supply chain management operations in accordance with an embodiment of the invention.

Described herein are the various embodiments of the present invention, which includes a method, a system and a computer program product for robotic process automation of supply chain management (SCM) operations.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "fixtures," "scripts," or "SCM scenario," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to a system and method for robotic process automation with multiple integrated tools configured for automating the processes while working on many supply chain management operations including but not limited to procurement operations.

Referring to FIG. 1, an RPA system 100 for supply chain management (SCM) operations is provided in accordance with an embodiment of the present invention. The system 100 includes at least one computing device/entity machine 101 for sending SCM scenario like a procurement scenario over a network. The system 100 further includes a server 106 configured to receive the scenario from the entity machine 101. The system 100 includes an automation support architecture 107 for performing automation depending upon the type of scenario received at the server 106. The system 100 includes a memory data store 108 for accessing SCM scenario like a procurement scenario data, voice data, image data, functional data, fixtures etc. to be processed based on AI. The system 100 connecting various elements through a network 109. The network 109 enables formation of sub networks depending on the requirement of the SCM operation.

In an embodiment, the entity machine 101 may communicate with the server 106 wirelessly through communication interface, which may include digital signal processing circuitry. Also, the entity machine 101 may be implemented in a number of different forms, for example, as a smartphone, computer, personal digital assistant, or other similar devices. The entity machine 101 includes internal circuitry 102 that may include processor 103, memory 104 and storage device 105.

In an embodiment the server 106 of the invention may include various sub-servers for communicating and processing data across the network. The sub-servers include, but are not limited to, content management server, application server, directory server, database server, mobile information server and real-time communication server.

In an example embodiment, the server 106 may include electronic circuitry 111 for enabling execution of various steps by a processor of the server 106. The electronic circuitry 111 has various elements including but not limited to a plurality of arithmetic logic units (ALU) 112A and floating point Units (FPU) 112B. The ALU 112A enables processing of binary integers to assist in formation of a tables/matrix of variables where a fixture is applied to the data matrix for automating SCM operations like a procurement operation. In an example embodiment, the server electronic circuitry 111 as shown in FIG. 1, may additionally include other processors, memory, storage devices, high-speed interfaces connected through buses for connecting to memory and high-speed expansion ports, and a low speed interface connecting to low speed bus and storage device. Each of the components of the electronic circuitry 111 are interconnected using various busses and may be mounted on a common motherboard or in other manners as appropriate. The processor 114 can process instructions for execution within the server 106, including instructions stored in the elements of the memory data store 108 like memory or on the storage devices to display graphical information for a GUI on an external input/output device, such as display coupled to a high speed interface. In other implementations, multiple processors and/or multiple busses may be used, as appropriate, along with multiple memories and types of memory. Also, multiple servers may be connected, with each server providing portions of the necessary operations (e.g., as a server bank, a group of blade servers, or a multiprocessor system).

In an example embodiment, the automation support architecture 107 of the system 100 includes a controller 113 encoded with instructions enabling the controller 113 to function as a bot configured to generate plurality of fixtures. The system also includes a processor 114 configured to process various functions based on the AI based processing of SCM operations by the bot. The support architecture 107 includes a data manager 115 for managing data relating to any SCM scenario of a SCM operation. In an example embodiment, the data may include spend data during spend analysis scenario of a procurement operation. The support architecture 107 includes an AI engine 116 for determining relevant fixtures for execution using the bot. Further, the support architecture 107 includes an execution engine 117 for receiving processed SCM scenario from the front end web server 106 to execute SCM operations. The support architecture 107 further includes an image processing unit 118 for processing an image data and converting it to a text data. Also, the architecture 107 includes a voice to text convertor 119 for enabling faster and accurate execution of SCM scenario. The architecture 107 includes a control unit 120 configured to process the at least one SCM scenario based on the identified relevant fixture for automating the SCM operations. The control unit 120 selects an Artificial Intelligence based dynamic processing logic using a bot to reduce the processing time of the SCM operations. Further, the support architecture 107 includes a verification engine 121 for verifying any error by creating voice based error messages to enable a user to rectify the error in absence of the data object.

The processor 114 may be implemented as a chipset of chips that include separate and multiple analog and digital processors. The processor 114 may provide coordination of the other components, such as controlling user interfaces, applications run by devices, and wireless communication by devices.

The Processor 114 may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user and convert them for submission to the processor 114. In addition, an external interface may be provided in communication with processor 114, so as to enable near area communication of device with other devices. External interface may provide, for example, for wired communication in some implementations, or for wireless communication in other implementations, and multiple interfaces may also be used.

In an example embodiment, the memory data store 108 includes plurality of databases as shown in FIG. 1. The data store 108 includes a SCM scenario database 122 for storing the at least one SCM scenario selected by the user, a functional database 123 for storing a library of functions enabling creation of a plurality of fixtures for SCM operation, an image database 124 for storing image data and a voice database 125 for storing voice or speech data. The data store 108 further includes an xml database 126 for storing xml files generated by embedding the SCM scenario specific data on the identified fixture.

The memory data store 108 may be a volatile, a non-volatile memory or memory may also be another form of computer-readable medium, such as a magnetic or optical disk.

The memory store 108 may also include one or more storage devices capable of providing mass storage. In one implementation, at least one of the storage devices may be or contain a computer-readable medium, such as a floppy disk device, a hard disk device, an optical disk device, a tape device, a flash memory or other similar solid state memory device, or an array of devices, including devices in a storage area network or other configurations.

In an embodiment the system 100 includes at least one IOT device 110 configured to capture, store and transmit a SCM specific data relevant to the at least one SCM scenario. The IOT device 110 may be in secured communication with the at least one server 106 as part of the sub network.

In an example embodiment, the at least one IOT device 110 may be a tracking device, an intelligent sensor, a smartphone, a voice controller, an image capturing device, a gesture controller, a smart watch or a combination thereof.

Figure 1A:
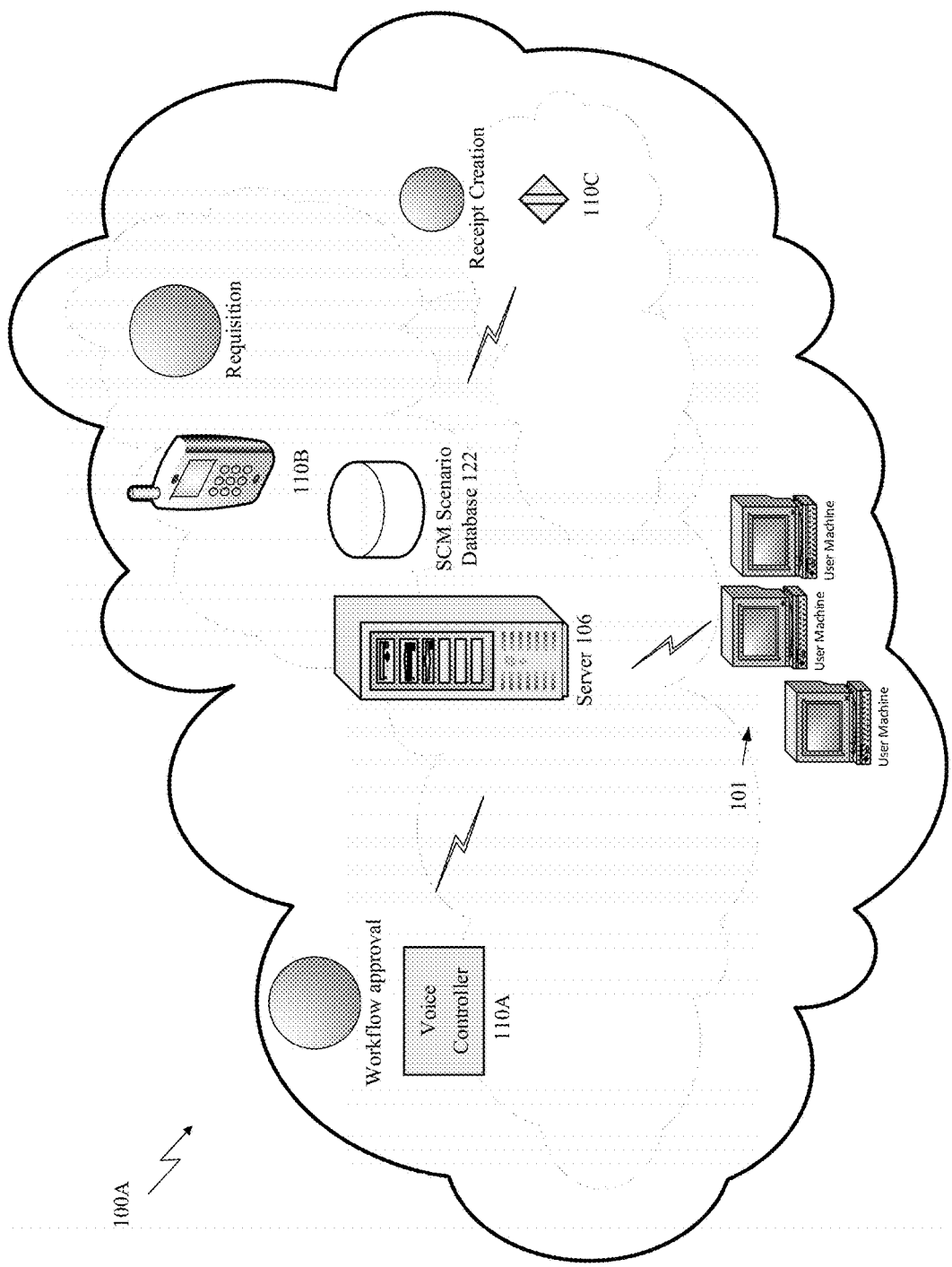
FIG. 1A is a view of a sub network of the RPA system in accordance with an embodiment of the invention.

In an example embodiment of the invention, the RPA system 100 provides a sub network 100A as shown in FIG. 1A. The sub-network 100A includes the at least one server 106 in communication with a plurality of IOT devices 110 like Voice controller 110A, smartphone 110B and sensor 110C. The Voice controller 110A enables execution of workflow approval steps of different scenarios like sourcing, requisition, receipts etc. by voice commands. The smartphone 110B enables creation of requisition with faster processing times. The sensor 110C enables sensing of the no. of goods entering a warehouse and generating receipts accordingly. Further the sub network 100A includes database 122 for storing scenarios and also includes entity machines/computing devices 101 for managing SCM operations.

In an example embodiment, the sub network 100A includes communication between various network components like sub-servers, IOT devices associated with multiple SCM scenarios etc, for executing the identified SCM operation. The sub network 100A enables interlinking of different SCM scenario components for performing an integrated operation and simultaneously also enables performance of identified single SCM operation by utilizing essential steps from the other network components of the sub-network.

In an embodiment the SCM operations include supplier management operations, procurement operations, inventory management operations, account payable operations etc. An example of the present invention organizes the supply chain between manufacturers and service providers. In an example of the present invention, the SCM operations include elements that enable management of end-to-end supply chain information such as demand planning, order fulfillment, scheduling, inventory, etc.

In an example embodiment of the present invention, SCM with multiple manufacturers and service providers, some of the advantages of the present system include the fact that economies of scale are enabled, procurement and inventory are rationalized, distribution and logistics facilities are rationalized, and the development of an industry-wide standard is facilitated.

In an embodiment, the demand and supply of manufacturer offerings are planned utilizing the sub network in operation and orders for the manufacturer offerings are also managed utilizing the sub network with server and IOT devices in communication with each other for information capturing and exchange. The sub network is also utilized to manage sub network assets including providing maintenance and service for the sub network assets utilizing the sub network.

In one of the advantageous aspects of the present invention, the RPA system for SCM operations provide revenue enhancement, cost reduction and capital reduction by efficient utilization of resources with reduced timelines due to automation of the various SCM operations.

In a related aspect, the revenue enhancement includes faster site integration time, enhanced network performance, rapid integration of acquisition and faster order to cash. The cost reduction includes duplication reduction, rationalization of distribution facility, rationalization of procurement operations, simplified processes and rationalization of transportation. The capital reduction includes reduced inventories due to faster processing times of SCM operations, and appropriate utilization of manufacturing capacity.

In an embodiment, the procurement operations of the SCM include requisition, spend analysis, sourcing, Contracts, procure to pay (P2P), supplier management, Invoice management etc. It shall be understood to a person with ordinary skill in the art that the procurement operations may include other operations not listed above.

In an embodiment, the inventory management operation of the SCM at a warehousing includes scanning of a set of received goods by the at least one IOT device 110 and transmitting the SCM scenario specific warehousing data of the scanned goods to the at least one server for creating receipts, labels and notifications using the bot.

In example embodiments, the bot is a software bot or a combination of a software and hardware bot. In an embodiment, the software bot is a computer program enabling a processor to perform robotic process automation by utilizing AI. In another embodiment, the bot as a combination of hardware and software, where the hardware includes memory, processor, controller and other associated chipsets especially dedicated to perform functions that enable robotic process automation for SCM operations.

In an embodiment, the at least one scenario includes command data like creation, editing or cancellation of requisition as a procurement operation of SCM.

In an embodiment, the at least one server includes a front end web server communicatively coupled to at least one SQL server wherein the front end web server is configured for reprocessing the at least one SCM scenario based on the plurality of fixtures by receiving the at least one SCM scenario processed by the SQL server and applying the AI based dynamic processing logic to the SCM scenario using the bot for automating the SCM operations.

In an embodiment, the system 100 includes an execution engine for receiving processed SCM scenario from the front end web server for performing SCM operations through the electronic user interface.

In an embodiment, the system 100 includes an AI engine for processing the AI based dynamic processing logic wherein the processing logic includes a sequential or a parallel processing logic or a combination thereof.

In an embodiment, the plurality of fixtures are backend scripts created by the bot based on the SCM scenario and AI based processing for enabling automation of the SCM operations. The bot analyzes the SCM scenario and creates fixtures for automation of the SCM scenario by reducing the processing steps based on AI based processing.

In an embodiment of the present invention, any SCM operation requires a finite amount of processing time on a computer processor. The present invention restrains SCM operation steps using fixtures created by the bot and AI to select the fastest processing route for the SCM operation while simultaneously satisfying the needs of obtaining accurate results, data elements are organized/processed depending on the demands of the computing resources, which allow more SCM scenarios to be processed with same resources (e.g., disk space, processor speed, memory, etc.). Thus, the net result of the claimed invention provides improved processing and functioning of systems with RPA. The logical processes involved with the RPA defines the improvement.

Referring to FIG. 1, the various elements like the support architecture 107 and the memory data store 108 are shown as external connections to the server 106 in accordance with an embodiment of the invention. However, it shall be apparent to a person skilled in the art that these elements may be part to an integrated server system. Also, some of the sub-elements of the support architecture 107 and the memory data store 108 either alone or in various combinations may be part of a server system as other external connections.

The computing devices 101 referred to as the entity machines, server, processor etc. of the present invention are intended to represent various forms of digital computers, such as laptops, desktops, workstations, personal digital assistants, and other appropriate computers. Computing devices of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

Figure 2:
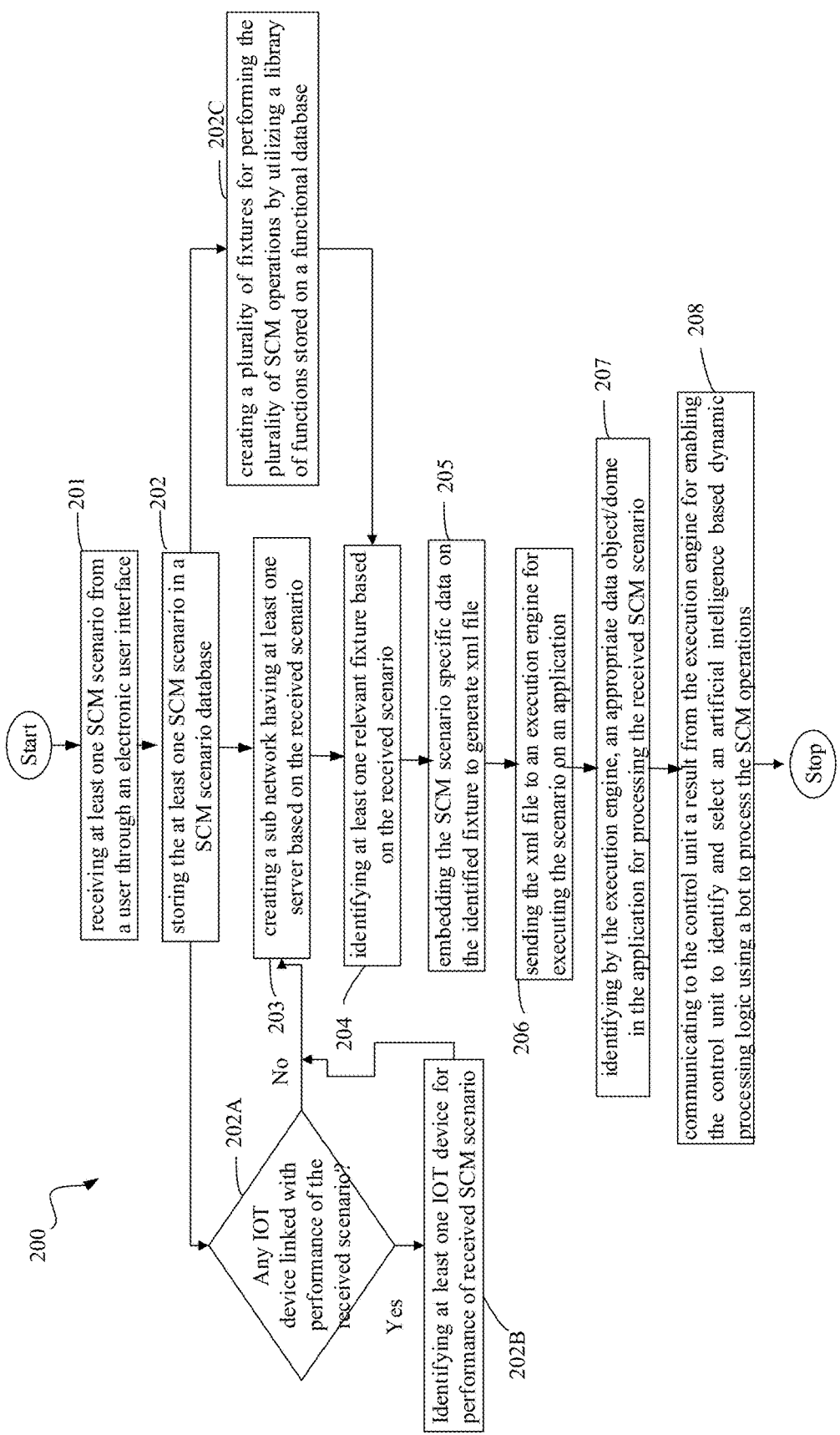
FIG. 2 is a flowchart depicting a method of robotic process automation (RPA) for supply chain management operations in accordance with an embodiment of the invention.

Referring to FIG. 2, a flowchart 200 depicting a method for robotic process automation of procurement operations is provided. The method including the steps of S201 receiving at least one SCM scenario from a user through an electronic user interface. In S202 storing the at least one SCM scenario in a SCM scenario database and in S203 creating a sub network having at least one server based on the received scenario. In S204 identifying at least one relevant fixture based on the received scenario and in S205 embedding the SCM scenario specific data on the identified fixture to generate xml file. In S206 sending the xml file to an execution engine for executing the scenario on an application. In S207 identifying by the execution engine, an appropriate data object/dome in the application for processing the received SCM scenario and in S208 communicating to the control unit a result from the execution engine for enabling the control unit to identify and select an artificial intelligence based dynamic processing logic using a bot to process the SCM operations.

In a related embodiment, the method of the present invention includes the step S202A of checking IOT device linked with performance of the SCM scenario. If at least one IOT device is linked, then in step S202B the IOT device is identified as part of the sub network with the at least one server.

In an exemplary embodiment, the RPA method includes generating a code for at least one SCM scenario by using the at least one processor, where the at least one SCM scenario is selected from the plurality of SCM operations by a user. Further, the method includes step S202C creating a plurality of fixtures for performing the plurality of SCM operations by utilizing a library of functions stored on a functional database. The method includes processing of the plurality of fixtures using at least one server to identify relevant fixture for the at least one SCM scenario. The bot of the RPA system reduces the processing time of the procurement operations.

In an embodiment, the SCM scenario specific data is a text data, image data or combination thereof. The method of the present invention utilizes different types of data for faster processing and execution of the SCM scenarios.

In a related aspect, the method of the present invention includes the step of converting the SCM scenario specific data to a voice or speech data by using a text to speech convertor for verification of accuracy of SCM scenario specific data.

In an embodiment, the method includes the step of converting the image data to a text data using image processing before embedding on the identified fixture. The conversion of image data to text enables processing in finite amount of time.

In an embodiment, the method includes the step of converting the text data to a voice or speech data using a text to speech convertor for verification of SCM scenario specific data using the verification engine. The complex SCM systems increases are error prone and the verification step in RPA method by using voice data reduces the possibility of errors.

In an embodiment, the method includes the step of comparing the image to text converted text data with a SCM scenario specific text data at the time of execution for determining error in the SCM scenario specific data.

In an embodiment, the method includes the step of creating voice based error messages to enable a user to rectify the error in absence of the data object.

In an embodiment, the data object includes UI data like text box, tick box, and backend data like file, database table, database field etc.

In an embodiment, the AI based processing logic integrates deep learning, predictive analysis, information extraction, planning, scheduling, optimization and robotics for processing the SCM operations by the control unit.

In an embodiment, the AI based dynamic processing logic includes a sequential or parallel processing logic or a combination thereof.

In an embodiment, the plurality of fixtures are backend scripts created by the bot based on the SCM scenario and AI based processing logics. The scripts utilize dynamically created algorithms based on AI based processing of SCM scenarios by using the bot. The bot analyzes use cases, activity diagrams, sequence diagrams and behaviors of the system under automation for creating the scripts automatically. The bot analyzes data objects/dome in the application and processes the received scenario based on the various characteristics associated with these objects like location, associated functions, processing time of the functions and probability of combining of these objects to execute the scenario with reduced steps in finite time.

In an example embodiment of the present invention, the bot enables automated processing of a SCM operation like a procurement operation to create requisition. The requisition process as a procurement operation involves multiple tasks to be performed by a user. In this example of the invention, the system creates fixtures for performing these tasks automatically thereby reducing the processing time and costs involved in maintaining manual process leads. Further, the data elements required for performing the multiple tasks can be obtained from IOT devices like sensors, smartphones, smartwatches etc., that are in communication with the server for performing SCM operation. For e.g., the IOT devices may monitor a requisition operation and gather information about the required number of goods for which a procurement is required.

In another example embodiment of the present invention, the bot enables automated processing of a SCM operation like an inventory management operation at a warehouse. In this example embodiment, the inventory management operation includes scanning of a set of received goods by the at least one IOT device and transmitting the SCM scenario specific warehousing data related to the scanned goods to the at least one server for creating receipts, labels and notifications using the bot.

In a related embodiment, in case of a defective good or incorrect good supply, the IOT device may raise an alert to the RPA system for replacement of the good. The server of the RPA system may automatically reject the order or mark it as partially delivered with the exact details of the goods like batch number, goods identification number, etc, as captured by the IOT device during scanning.

In an example embodiment, the complexity involved in execution of various supply chain management operations require systems and methods that process these operations in reduced timelines with accuracy. Various supply chain operations like procurement, inventory management, distribution and warehousing etc., when executed in an integrated manner, do not merely perform the functions that each operation would perform separately. Also, the scenarios of a SCM operation are integrated to achieve faster processing times, for example, during a procurement operation. Consider, for example, a procurement operation with spend analysis, contract management, sourcing, requisition/PO and invoice management as different scenarios as shown in FIG. 3. The bot and AI in a non-limiting example of the present invention creates fixtures that are novel in integrating various steps of these scenarios by analyzing data objects/dome in the application to process the operation faster. Also, combining two or more scenarios leads to performance of another scenario i.e the combination of scenarios contributes towards performance of another scenario. In the above example, depicted by the flowchart 300, in S301 the SCM operation is identified based on the received SCM scenario. In S302 a sub-network is created and IOT devices associated with components of the sub network are identified. In S303, processing of the SCM operation is initiated, say a procurement operation is initiated and the identified procurement scenario along with the associated/linked scenarios as part of an integrated RPA system for faster processing is initiated. Consider some of the scenarios as sub processes spend analysis in S304, sourcing in S305, Contract management in S306, and requisition/PO in S307. Spend analysis S304 allows determination of a company's spending towards procurement of any product. Sourcing S305 helps to publish request for proposal (RFP) to different suppliers and collect information and rank them. Contract Management S306 allows monitoring a contract through its life cycle and determine the expiry dates. Requisition/PO S307 as a scenario of a procurement operation raises a requisition based on the demand of a product and provide the Purchase order which goes through different approval process based on certain rules. However, in case of combining these scenarios for another scenario, say raising an invoice management in S308 certain factors are considered for approving the request, i.e. the information about spend and budgeting of a company to know the kind of requisitions that can be approved before an invoice is raised. When these scenarios function independently, the requisition may not consider the spend and budgeting. Also, during the sourcing scenario S305, a user may wish to restrict the activity to a group of suppliers with whom the user has dealt previously based on the contract management S306, thereby saving time on negotiations and review of all clauses again and again. When functioning independently, these scenarios do not consider the previously contracted suppliers separately depending upon the goods or services being procured. These scenarios are integrated to perform another scenario of raising an invoice S308 where these scenarios when integrated do not merely perform the function that they perform when functioning independently. In this case, the steps performed for raising an invoice would need to consider the information of spend and budgeting data, certain rules set for approvals for the requisitions made based on category and depending on that the scenario of invoice management is to be performed. The bot considers all these factors for automatically creating the fixtures to reduce the time required for processing any SCM operation or combination thereof. The various elements of a scenario are reusable to accomplish different results.

Exemplary embodiments of the present invention, may be a system, a method, and/or a computer program product. The computer program product may include a computer readable storage medium (or media) having computer readable program instructions thereon for causing a processor to carry out aspects of the present invention. The media has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device, for example, it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the appended claims.

What is claimed is:

1. A robotic process automation (RPA) system for supply chain management (SCM) operations, the system comprising:
    an electronic user interface configured to perform a plurality of SCM operations;
    at least one processor configured to automatically generate code for at least one SCM scenario, wherein the at least one SCM scenario is selected from the plurality of SCM operations by a user;
    a controller encoded with instructions enabling the controller to function as a bot configured to generate a plurality of fixtures created for performing the plurality of SCM operations by utilizing a library of functions stored on a functional database, wherein the plurality of fixtures are backend scripts created by bot based on the at least one SCM scenario, data objects/dome and AI processing for enabling automation of the SCM operations;
    a sub network having at least one server configured to process the plurality of fixtures to identify relevant fixture for the at least one SCM scenario, and a control unit configured to process the at least one SCM scenario based on the identified relevant fixture for automating the SCM operations, wherein the control unit selects an Artificial Intelligence based dynamic processing logic using the bot to reduce the processing time of the SCM operations.

2. The system as claimed in claim 1, further comprising:
    a SCM scenario database for storing the at least one SCM scenario selected by the user.

3. The system as claimed in claim 1, further comprising:
    an AI engine configured to process the AI based dynamic processing logic, wherein the processing logic includes one of a sequential processing logic, a parallel processing logic, and a combination sequential and parallel processing logic.

4. The system as claimed in claim 1 further comprising:
    at least one IOT device configured to capture, store and transmit a SCM specific data relevant to the at least one SCM scenario.

5. The system as claimed in claim 4, wherein the sub network includes the at least one IOT device in secured communication with the at least one server.

6. The system as claimed in claim 5, wherein the at least one IOT device is a tracking device, an intelligent sensor, a smartphone, a voice controller, an image capturing device, a gesture controller, a smart watch or a combination of thereof.

7. The system as claimed in claim 4, wherein the SCM operations include at least one of supplier management operations, procurement operations, inventory management operations, account payable operations, transportation management operations, and material management operations.

8. The system as claimed in claim 7, wherein the procurement operations of the SCM include at least one of requisition, spend analysis, sourcing, Contracts, procure to pay (P2P), supplier management and invoice management.

9. The system as claimed in claim 7, wherein the at least one scenario includes command data associated with at least one of creating, editing, and cancelling a requisition as a procurement operation of SCM.

10. A robotic process automation (RPA) system for supply chain management (SCM) operations, the system comprising:
    an electronic user interface configured to perform a plurality of SCM operations;
    at least one processor configured to automatically generate code for at least one SCM scenario, wherein the at least one SCM scenario is selected from the plurality of SCM operations by a user;
    a controller encoded with instructions enabling the controller to function as a bot configured to generate a plurality of fixtures created for performing the plurality of SCM operations by utilizing a library of functions stored on a functional database;

a sub network having at least one server configured to process the plurality of fixtures to identify relevant fixture for the at least one SCM scenario, and a control unit configured to process the at least one SCM scenario based on the identified relevant fixture for automating the SCM operations, wherein the control unit selects an Artificial Intelligence based dynamic processing logic using the bot to reduce the processing time of the SCM operations;

at least one IOT device configured to capture, store and transmit a SCM specific data relevant to the at least one SCM scenario, wherein the SCM operations include at least one of supplier management operations, procurement operations, inventory management operations, account payable operations, transportation management operations, and material management operations, and wherein an inventory management operation of the plurality of SCM operations at a warehouse includes scanning of a set of received goods by the at least one TOT device and transmitting the SCM scenario specific warehousing data related to the scanned goods to the at least one server for creating receipts, labels and notifications using the bot.

11. A robotic process automation (RPA) s stem for supply chain management (SCM) operations, the s stem comprising:

an electronic user interface configured to perform a plurality of SCM operations;

at least one processor configured to automatically generate code for at least one SCM scenario, wherein the at least one SCM scenario is selected from the plurality of SCM operations by a user;

a controller encoded with instructions enabling the controller to function as a bot configured to generate a plurality of fixtures created for performing the plurality of SCM operations by utilizing a library of functions stored on a functional database;

a sub network having at least one server configured to process the plurality of fixtures to identify relevant fixture for the at least one SCM scenario, and a control unit configured to process the at least one SCM scenario based on the identified relevant fixture for automating the SCM operations, wherein the control unit selects an Artificial Intelligence based dynamic processing logic using the bot to reduce the processing time of the SCM operations, wherein the at least one server includes a front end web server communicatively coupled to at least one SQL server, wherein the front end web server is configured to reprocess the at least one SCM scenario based on the plurality of fixtures by receiving the at least one SCM scenario processed by the SQL server and applying the AI based dynamic processing logic to the SCM scenario to automate the SCM operations.

12. The system as claimed in claim 11, further comprising:

an execution engine configured to receive processed SCM scenario from the front end web server and perform SCM operations through the electronic user interface.

13. A robotic process automation (RPA) method for supply chain management (SCM) operations, the method comprising:

receiving at least one SCM scenario from a user through an electronic user interface;

storing the at least one SCM scenario in a SCM scenario database;

creating a sub network having at least one server based on the at least one SCM scenario;

identifying at least one relevant fixture based on the at least one SCM scenario;

embedding the SCM scenario specific data on the identified fixture to generate xml file;

sending the xml file to an execution engine for executing the scenario on an application;

identifying by the execution engine, an appropriate data object/dome in the application for processing the received SCM scenario; and communicating to a control unit a result from the execution engine to enable the control unit to identify and select an artificial intelligence based dynamic processing logic using a bot to process the SCM operations, wherein the fixture is a backend script created by the bot based on the SCM scenario, the data objects/dome and AI processing for enabling of the SCM operations.

14. The method as claimed in claim 13, wherein the data object includes UI data like text box, tick box, and backend data like file, database table, database field.

15. The method as claimed in claim 13, wherein the AI based dynamic processing logic includes one of a sequential processing logic, a parallel processing logic, and a combination of sequential processing logic and parallel processing logic.

16. The method as claimed in claim 13 further comprising the step of:

identifying at least one IOT device configured to capture, store and transmit a SCM specific data relevant to the at least one SCM scenario.

17. The method as claimed in claim 16, further comprising:

creating the sub network with at least one identified TOT device in secured communication with the at least one server.

18. The method as claimed in claim 17, wherein the SCM scenario specific data is at least one of text data, image data, and a combination of text data and image data.

19. The method as claimed in claim 18, further comprising:

converting the SCM scenario specific text data to at least one of voice and speech data by using a text to speech convertor for verification of accuracy of SCM scenario specific data.

20. The method as claimed in claim 18, further comprising:

converting the image data to a text data using image processing before embedding on the identified fixture.

21. The method as claimed in claim 20, further comprising:

converting the text data to at least one of voice data and speech data using a text to speech convertor for verification of SCM scenario specific data.

22. The method as claimed in claim 20, further comprising:

comparing the image to text converted text data with a SCM scenario specific text data at the time of execution for determining error in the SCM scenario specific data.

23. The method as claimed in claim 22, further comprising:

creating voice based error messages to enable a user to rectify the error in absence of the data object.

24. A robotic process automation (RPA) method for supply chain management (SCM) operations, the method comprising:

receiving at least one SCM scenario from a user through an electronic user interface;

storing the at least one SCM scenario in a SCM scenario database;

creating a sub network having at least one server based on the received scenario;

identifying at least one relevant fixture based on the received scenario;

embedding the SCM scenario specific data on the identified fixture to generate xml file;

sending the xml file to an execution engine for executing the scenario on an application;

identifying by the execution engine, an appropriate data object/dome in the application for processing the received SCM scenario; and communicating to the control unit a result from the execution engine to enable the control unit to identify and select an artificial intelligence (AI) based dynamic processing logic using a hot to process the SCM operations, wherein the AI based processing logic integrates deep learning, predictive analysis, information extraction, planning, scheduling, optimization and robotics for processing the SCM operations by the control unit.

25. A computer program product for robotic process automation on an application of a computing device with memory, the product comprising:

a computer readable storage medium readable by a processor and storing instructions for execution by the processor for performing a method, the method comprising:

receiving at least one SCM scenario from a user through an electronic user interface;

storing the at least one SCM scenario in a SCM scenario database;

creating a sub network having at least one server based on the at least one SCM scenario; identifying at least one relevant fixture based on the received scenario;

embedding the SCM scenario specific data on the identified fixture to generate xml file; sending the xml file to an execution engine for executing the scenario on an application;

identifying by the execution engine, an appropriate data object/dome in the application for processing the received SCM scenario; and communicating to a control unit a result from the execution engine to enable the control unit to identify and select an artificial intelligence based dynamic processing logic using a bot to process the SCM operations, wherein the fixture is a backend script created by the bot based on the SCM scenario, the data objects/dome and AI processing for enabling automation of the SCM operations.

* * * * *